United States Patent
Klein et al.

(10) Patent No.: US 8,843,914 B1
(45) Date of Patent: Sep. 23, 2014

(54) DISTRIBUTED UPDATE SERVICE

(75) Inventors: Matthew D. Klein, Seattle, WA (US); Gang Li, Bellevue, WA (US); Jiaqi Guo, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 239 days.

(21) Appl. No.: 13/236,529

(22) Filed: Sep. 19, 2011

(51) Int. Cl.
*G06F 9/44* (2006.01)

(52) U.S. Cl.
USPC .......................................... 717/170; 717/172

(58) Field of Classification Search
CPC ..................................... G06F 8/65; G06F 8/61
USPC .................................................. 717/170, 172
See application file for complete search history.

(56) References Cited

U.S. PATENT DOCUMENTS

| | | | |
|---|---|---|---|
| 5,909,581 A * | 6/1999 | Park | 717/170 |
| 6,687,901 B1 * | 2/2004 | Imamatsu | 717/173 |
| 7,260,818 B1 | 8/2007 | Iterum et al. | |
| 8,090,794 B1 * | 1/2012 | Kilat et al. | 709/217 |
| 8,245,220 B2 * | 8/2012 | Imamatsu | 717/173 |
| 2004/0073901 A1 * | 4/2004 | Imamatsu | 717/170 |
| 2006/0168578 A1 * | 7/2006 | Vorlicek | 717/168 |
| 2008/0184216 A1 * | 7/2008 | Muedsam | 717/168 |
| 2009/0217244 A1 | 8/2009 | Bozak et al. | |
| 2009/0300593 A1 | 12/2009 | Faus et al. | |
| 2010/0161717 A1 * | 6/2010 | Albrecht et al. | 709/203 |
| 2010/0179940 A1 | 7/2010 | Gilder et al. | |
| 2012/0159469 A1 | 6/2012 | Laor | |
| 2012/0174095 A1 | 7/2012 | Natchadalingam et al. | |
| 2012/0304163 A1 | 11/2012 | Raman et al. | |

OTHER PUBLICATIONS

About Watch Folders, Microsoft Technet, Feb. 27, 2012.

* cited by examiner

*Primary Examiner* — Phillip H Nguyen
(74) *Attorney, Agent, or Firm* — Knobbe Martens Olson & Bear, LLP

(57) ABSTRACT

Systems and methods are disclosed that facilitate the updating of target host computing devices based on versioning information. A set of host computing devices are provisioned with a local computing device management component. Each local computing device management component periodically transmits a request to a host computing device management component to determine whether version information associated with the respective host computing device corresponds to version filter information. Based on a processing of the version filter information with the current version information of the host computing device, the host computing device management component can facilitate the implementation of updates to the requesting host computing device.

28 Claims, 9 Drawing Sheets

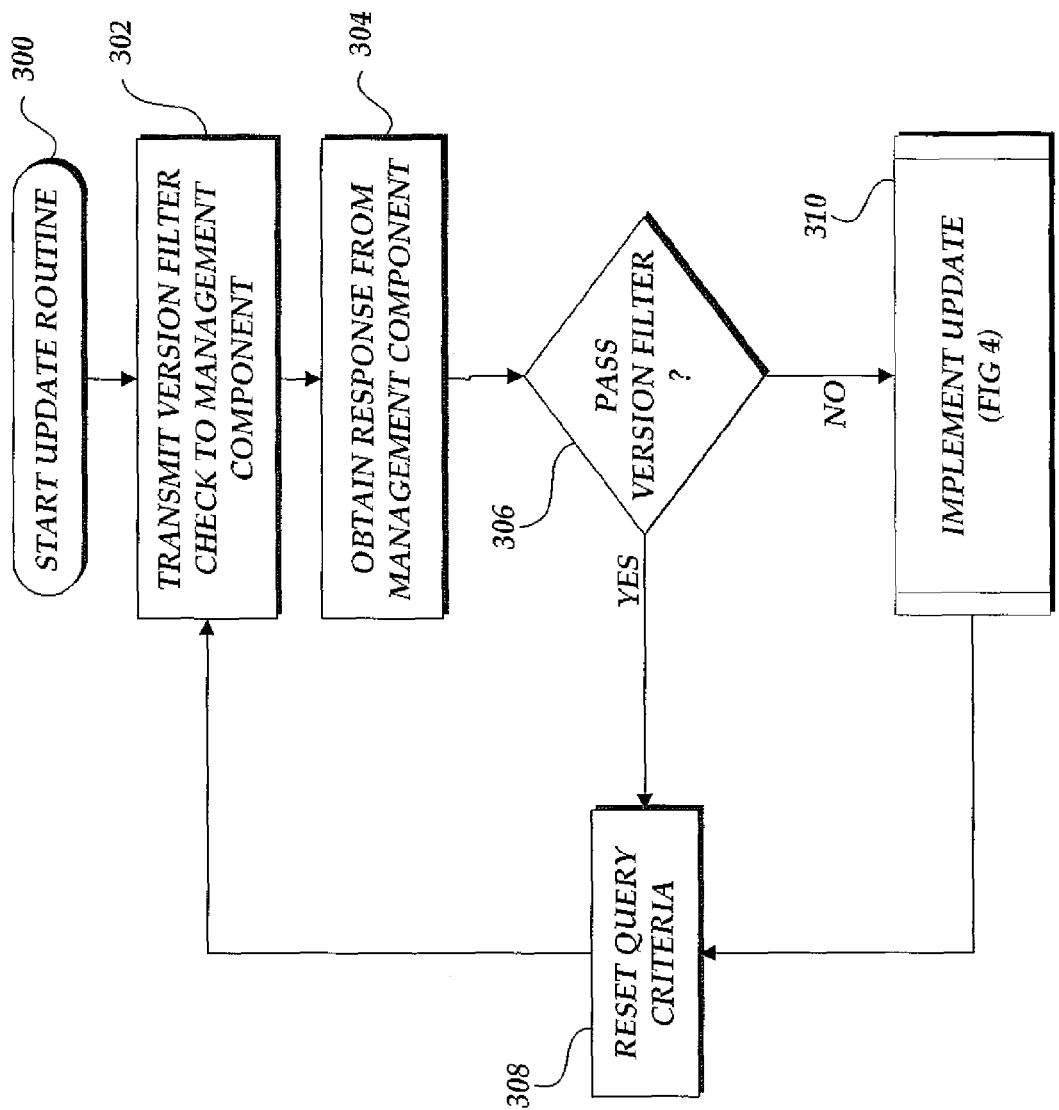

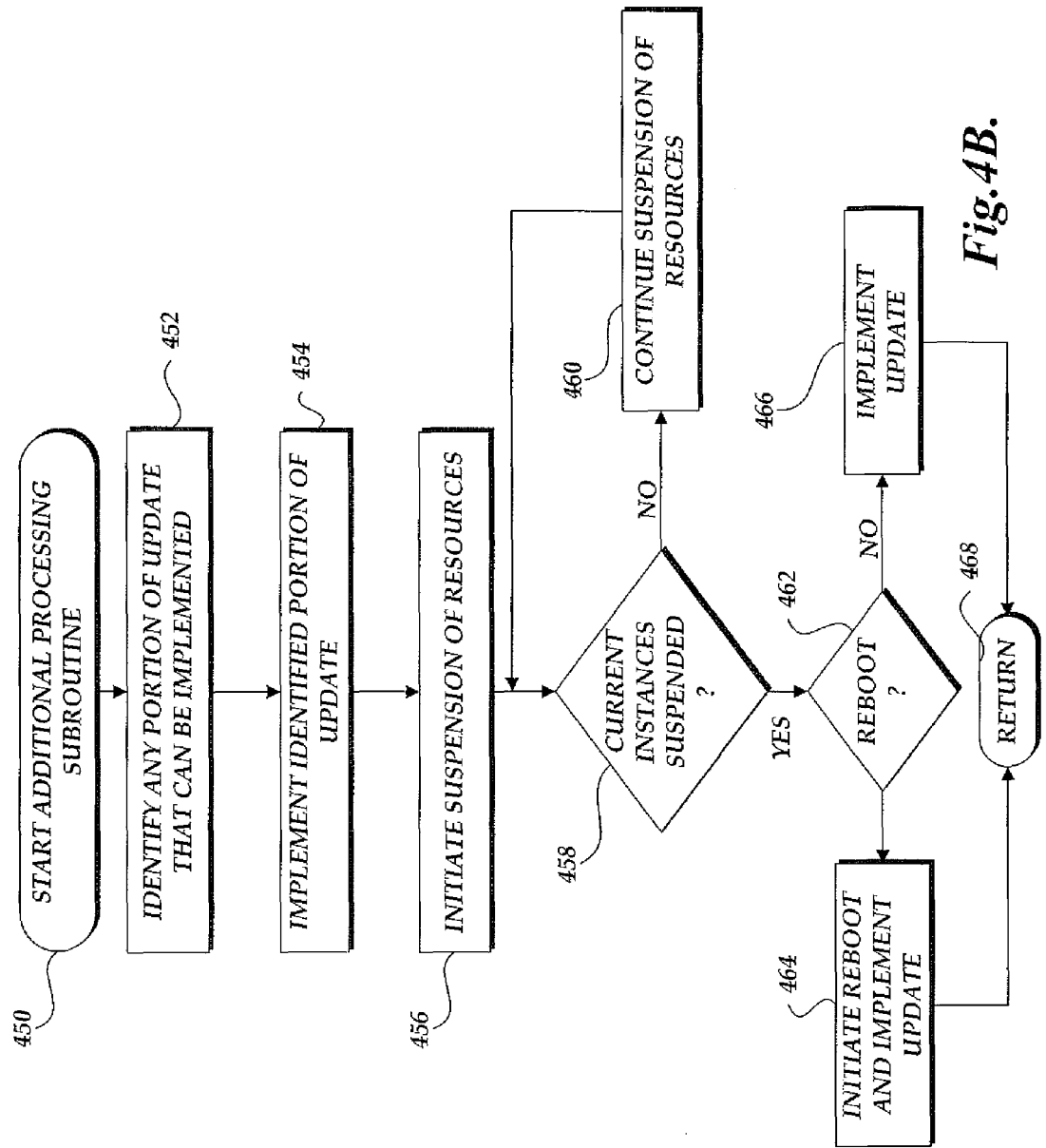

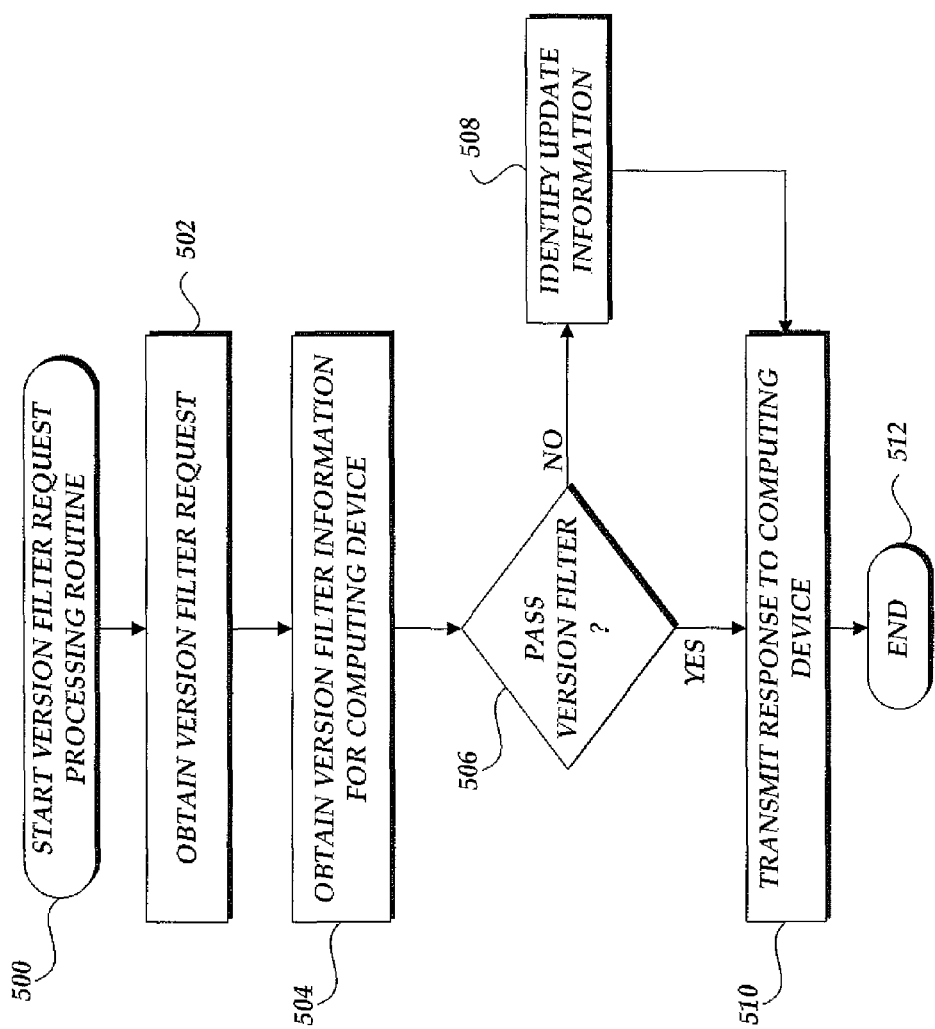

DISTRIBUTED UPDATE SERVICE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, the physical computing devices or instances of a virtual machine may be configured according to a number of virtual machine instance types to provide specific functionality, often referred to as provisioning. For example, various computing devices may be associated with different combinations of operating systems or operating system configurations, hardware resources (actual or virtualized) and software applications to enable a computing device to provide different desired functionalities, or to provide similar functionalities more efficiently. These customized configurations are often provided within a device image, which a computing device may process in order to implement the desired software configuration and which can be standardized among a set of host computing devices.

Once the initial provisioning has occurred or while an initial provisioning is occurring, however, at least a portion of the machine image (e.g., the operating environment, software applications, or configurations) may need to be updated. It can be difficult for a service provider to identify all possible host computing devices that may require updating or to implement update information for a large set of host computing devices.

BRIEF DESCRIPTION OF THE DRAWINGS

The foregoing aspects and many of the attendant advantages will become more readily appreciated by reference to the following detailed description, when taken in conjunction with the accompanying drawings, wherein:

FIG. 3 is a flow diagram illustrating an update routine implemented by a computing device;

FIG. 4B is a flow diagram illustrating an additional processing subroutine implemented by computing device;

FIG. 5 is a flow diagram illustrating a version filter request processing routine implemented by a computing device management component.

DETAILED DESCRIPTION

Generally described, aspects of the present disclosure relate to the management of computing devices. Specifically, systems and methods are disclosed that facilitate the updating of target computing devices, such as host computing devices or networking computing devices, based on versioning information. A set of computing devices are provisioned with a local computing device management component. Each local computing device management component periodically transmits a request to a computing device management component to determine whether version information associated with the respective computing device corresponds to a desired goal state for the computing device. Illustratively, the desired goal state of each computing device can be expressed in the form of version filter information. Based on a processing of the version filter information with the current version information of the computing device, the computing device management component can facilitate the implementation of updates to the requesting host computing device.

Figure 1:
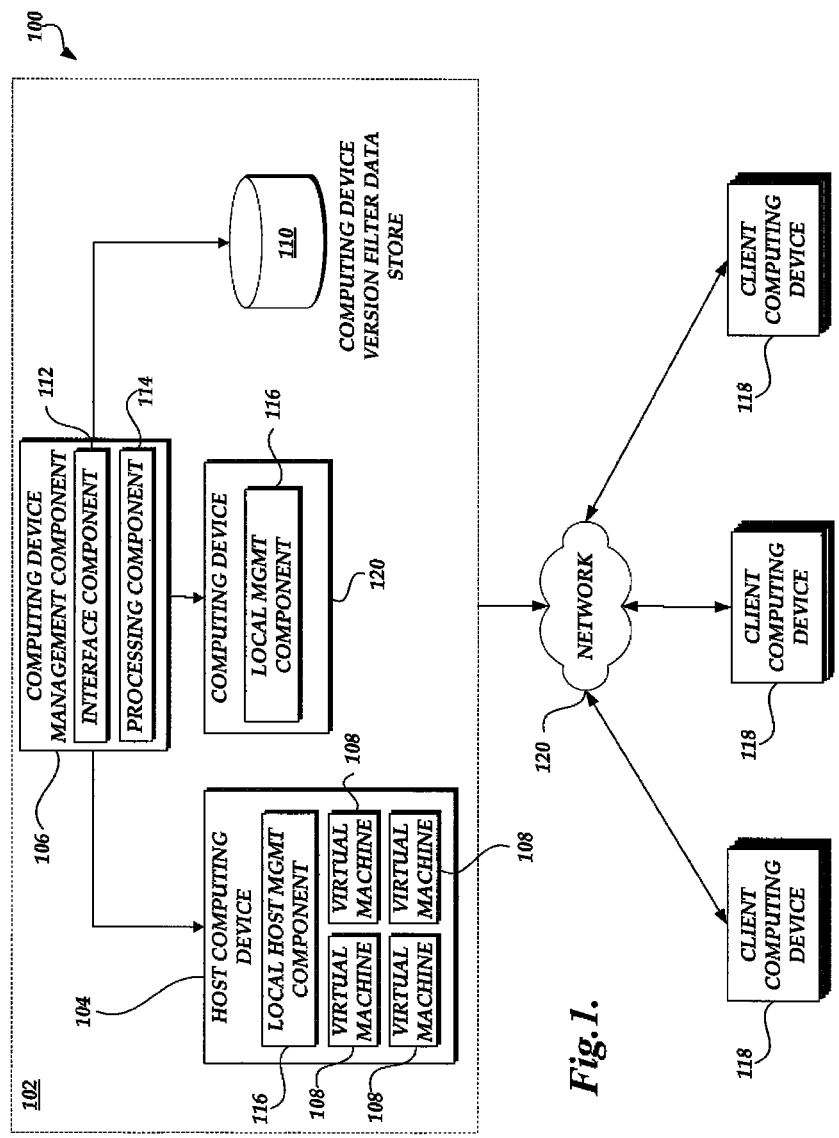
FIG. 1 is a block diagram depicting an illustrative virtual network environment including a number of computing devices and a computing device management component.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to host computing devices hosting virtual machine instances running applications, one or more aspects of the present disclosure can be applied with physical computing devices or combinations of physical computing devices and instantiated virtual machine instances. Accordingly, reference to the term "host computing device" does not imply the configuration of any specific functionality for a computing device or the requirement that the computing device host one or more virtual machine instances. Still further, one or more aspects of the present disclosure may be applicable to a variety of computing devices, including, but not limited to, networking computing devices, FIG. 1 is a block diagram illustrating an embodiment of a virtual network environment 100. The virtual network environment 100 includes a virtual network 102 that includes multiple physical computing devices, generally referred to herein as host computing devices 104. Each host computing device 104 is capable of hosting multiple virtual machine instances 108. At least some of the virtual machine instances 108 may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 102 is logical in nature and can encompass physical computing devices 104 from various geographic regions. As will be described in greater detail below, each host computing device 104 includes a local computing device management component 116 for transmitting version filter checks to a host computing device management component and processing the results of the check. In a further embodiment, the virtual network 102 can include one or more computing devices 120 that correspond to any one of a variety of computing devices, including, but not limited to network computing devices (e.g., routers, switches, etc.), communication computing devices, and the like. For example, one of the computing devices 120 can correspond to a router or switch or a computing device configured to emulate the functionality of the router or switch in the virtual network 102.

The virtual network 102 also includes a computing device management component 106 for processing requests for the determination of updates to host computing devices 104. Additionally, the computing device management component 106 can provide updates to one or more of host computing devices 104. Although illustrated as a single, stand-alone component, the computing device management component 106 can be implemented in a distributed manner. Additionally, one or more aspects of the computing device management component 106 may be implemented in other computing devices, such as a virtual machine instance.

With continued reference to FIG. 1, the virtual network 102 can further include a computing device version filter data store 110 for maintaining, at least in part, version filter information that corresponds to a defined goal state for version information for host computing devices 104 or computing devices 120. Additionally, the computing device version filter data store 110 can include information, such as executable code, configuration settings/information, and other information, utilized to identify or implement updates for the host computing devices 104 or computing devices 120. The computing device version filter data store 110 may correspond to network attached storage (NAS), database servers, local storage, or other storage configurations which may be implemented in a centralized or distributed manner. Additionally, although a single host computing device version filter data store 110 is illustrated, one skilled in the relevant art will appreciate that any number of data stores may be utilized to implement the computing device version filter data store 110.

Connected to the virtual network 102 via a network 120 are multiple client computing devices 118. The network 120 may be, for instance, a wide area network (WAN), a local area network (LAN), or a global communications network. In some instances, the client computing devices 118 may interact with the virtual network 102 to request or define version filter information or to define a distribution of version filter information for a set of host computing devices 104.

Figure 2A:
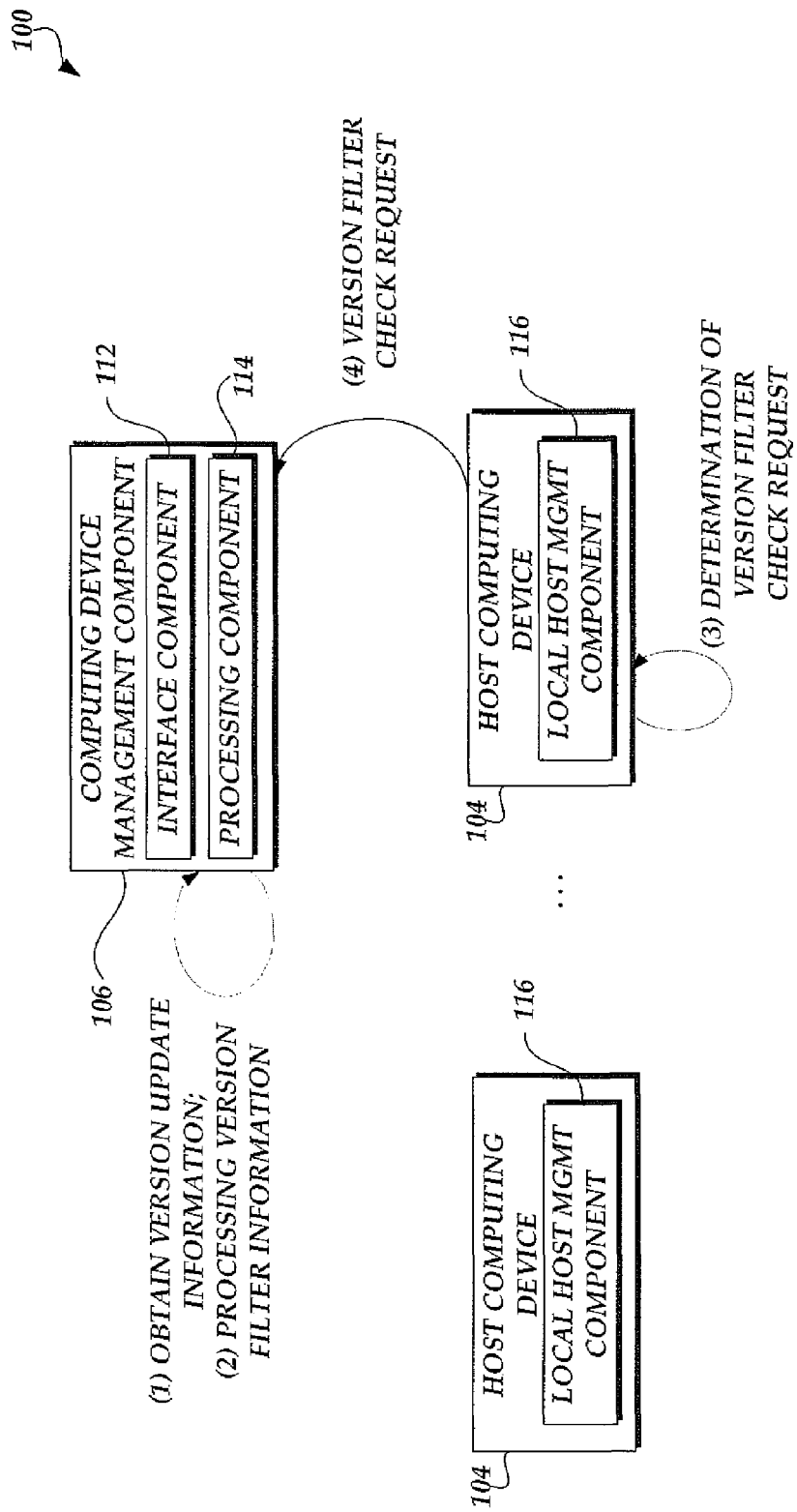
FIGS. 2A-2C are simplified block diagrams of the virtual network of FIG. 1 illustrating the updating of host computing devices based on version filter information.
Figure 2B:
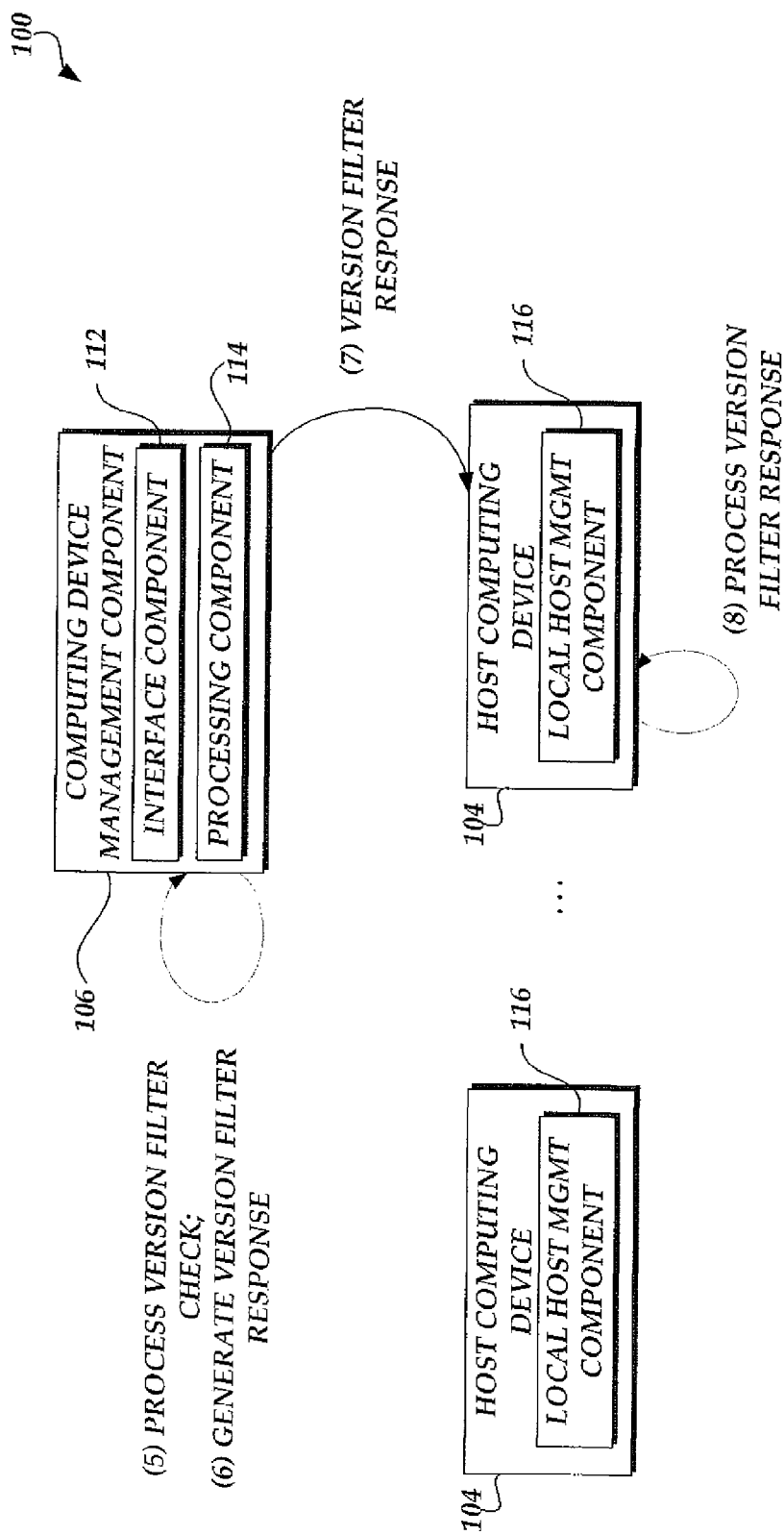
Figure 2C:
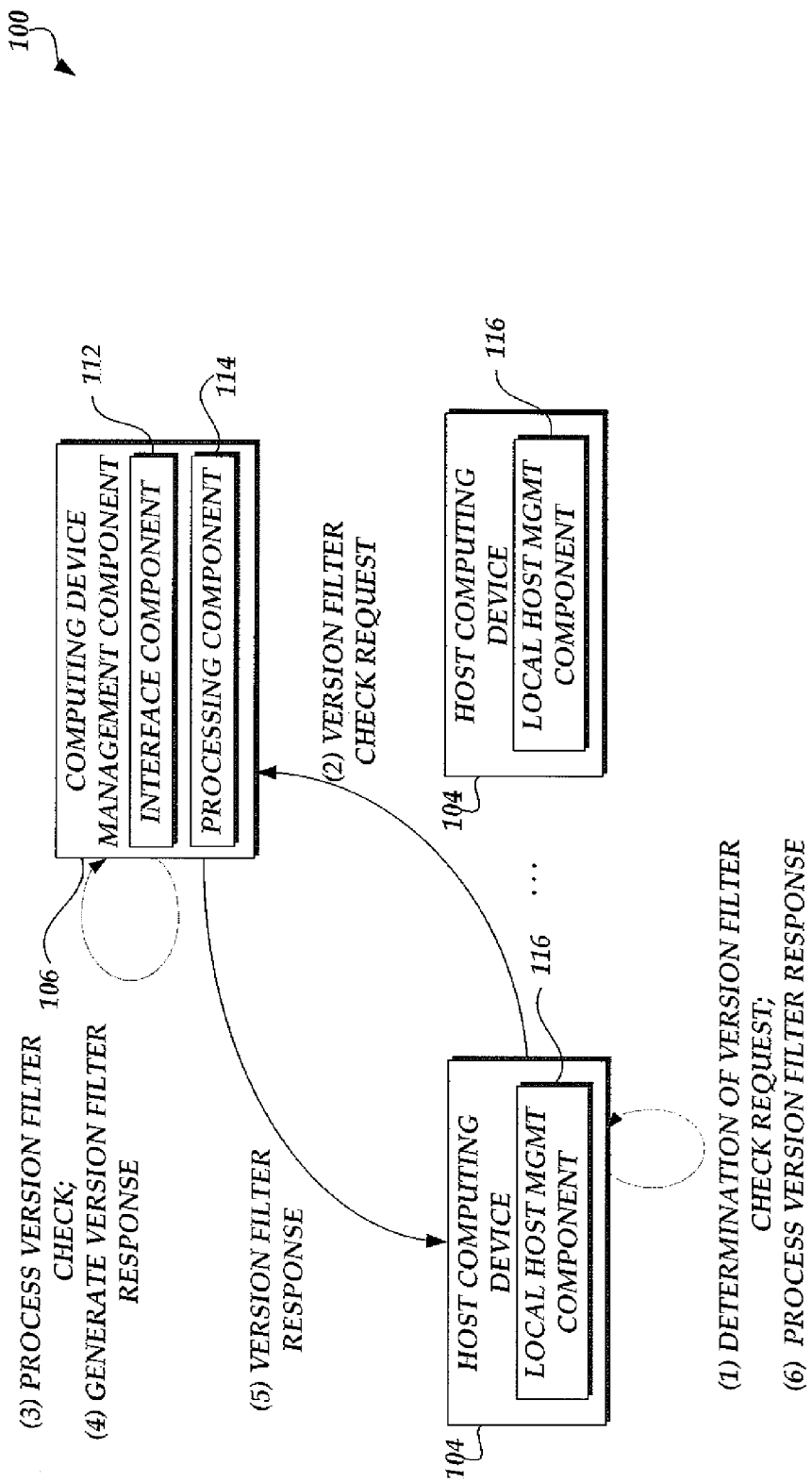

With reference now to FIGS. 2A-2C, illustrative interaction between the components of the virtual network 102 for the updating of host computing devices 104 based on versioning information and version filter information will be described. Although FIGS. 2A-2C will be described with regard to host computing devices 104, one skilled in the relevant art will appreciate that similar interaction may be implemented on computing devices 120 or combinations of host computing devices 104 and computing devices 120. Accordingly, the interactions illustrated in FIGS. 2A-2C should not be construed as limiting.

With reference first to FIG. 2A, the computing device management component 106 obtains version update information corresponding to a desired version goal state for a set of host computing devices 104 (1). Illustratively, the specification of the desired goal state may be transmitted by a client computing device 118, such as a client computing device associated with a system administrator, in accordance with an Application Protocol Interface ("API"). Alternatively, the computing device management component 106 may make the determination of the desired goal state based on processing information made available by a network based service, processing error reports, or making comparisons of software application or operating system environments of other host computing devices 104.

Illustratively, the computing device management component 106 processes version filter information for each host computing device 104 that is in the virtual network 102 or in a set of host computing devices (2). For example, the computing device management component 106 may process version filter information for each host computing device 104 in a data center. In one embodiment, the computing device management component 106 may not necessarily be able to identify each host computing device 104 that is currently operational in the set of host computing devices (e.g., within a data center). For example, one or more host computing devices 104 may be periodically removed or added to the data center without specific tracking information provided to the computing device management component 106. Accordingly, the version filter information may be defined for host computing devices 104 based on specific identification information for an individual host computing device or based on general characteristics of a host computing device (e.g., any host computing device that is provisioned with a type of software application).

Still further, the modification of the version filter information for a set of host computing devices 104 may be based on a time distribution of updates for the set of host computing devices. In one example, the computing device management component 106 may modify version filter for a small subset of the set of host computing devices as a test group. In another example, the computing device management component 106 may implement a random or pseudo-random modification of version filter information. In still a further example, the computing device management component 106 may apply additional criteria regarding aspects of the host computing devices, such as geographic location, shared computing resources, performance, priority information and the like.

With continued reference to FIG. 2A, at some point, a local computing device management component 116 on a host computing device 104 makes a determination to transmit a version filter check to the computing device management component 106 (3). In one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum), and the like. Additionally, the local computing device management component 116 can also implement time based criteria for distributing the timing of the requests to the computing device management component 106. Based on the determination, the local computing device management component 116 transmits the version filter check to the computing device management component 106 (4).

With reference now to FIG. 2B, the computing device management component 106 obtains the filter request and processes a version filter request (5). Illustratively, the computing device management component 106 obtains version information that is included in the version filter check transmitted by the local computing device management component 116. Alternatively, the computing device management component 106 can transmit requests to the local computing device management component 116 for specific information or additional information as necessary. Illustratively, the computing device management component 106 makes a comparison of the current version information associated with the requesting host computing device 104 to determine whether the host computing device is associated with desired version goal state, as defined in the version filter information.

Based on the comparison, the computing device management component 106 can then generate a version filter response (6). In one embodiment, the computing device management component 106 can generate a notification that an update is required. Additionally, the computing device management component 106 can provide update information utilized by the requesting host computing device 104 to cause an update to software code. In another embodiment, the computing device management component 106 can transmit a notification that no update is necessary. Alternatively, the computing device management component 106 may not transmit any notification if the version filter check passes. Still further, the computing device management component 106 can generate information that will be used by the local computing device management component 116 to transmit the next version filter check requests. The resulting information is transmitted to the requesting host computing device 104 (7) and processed (8).

Turning now to FIG. 2C, as previously described, each local computing device management component 116 on the host computing device 104 can make a determination of whether to transmit a version filter check (1). In one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum), and the like. Additionally, the local computing device management component 116 can also implement time based criteria for distributing the timing of the requests to the computing device management component 106. Based on the determination, the local computing device management component 116 transmits the version filter check to the computing device management component 106 (2).

The computing device management component 106 obtains the filter request and processes a version filter request (3). Illustratively, the computing device management component 106 obtains version information that is included in the version filter check transmitted by the local computing device management component 116. Alternatively, the computing device management component 106 can transmit requests to the local computing device management component 116 for specific information or additional information as necessary. Illustratively, the computing device management component 106 makes a comparison of the current version information associated with the requesting host computing device 104 to determine whether the host computing device is associated with desired version goal state, as defined in the version filter information.

Based on the comparison, the computing device management component 106 can then generate a version filter response (4). In one embodiment, the computing device management component 106 can generate a notification that an update is required. Additionally, the computing device management component 106 can provide update information utilized by the requesting host computing device 104 to cause an update to executable code, modify configuration information. In another embodiment, the computing device management component 106 can transmit a notification that no update is necessary. Alternatively, the computing device management component 106 may not transmit any notification if the version filter check passes. Still further, the computing device management component 106 can generate information that will be used by the local computing device management component 116 to transmit the next version filter check requests. The resulting information is transmitted to the requesting host computing device 104 (5) and processed (6).

Turning now to FIG. 3, a routine 300 for generating an update request, such as a version filter request, implemented by a local computing device management component 116 on a host computing device 104 will be described. Although routine 300 will be described with regard to the local computing device management component 116, one skilled in the relevant art will appreciate that one or more portions of routine 300 may be implemented by other components of the host computing device 104. At block 302, the host computing device 104 transmit a version filter check request to the computing device management component 106. As previously described, in one embodiment, the determination whether to transmit the version filter check may be based on time criteria, such as minimum and maximum times for transmitting version filter check requests. In another embodiment, the determination of whether to transmit the version filter check may be based on other criteria, such as a communication network availability, error conditions, performance thresholds (maximum and minimum), and the like. Additionally, the local computing device management component 116 can also implement time based criteria for distributing the timing of the requests to the computing device management component 106.

At block 304, the host computing device 104 obtains a response from the host computing device 104. In an illustrative embodiment, the host computing device 104 can obtain information that identifies whether the version filter check resulted in a determination of whether the host computing device satisfies the desired version goal state. Additionally, the resulting information can also include information identifying any updates that should be implemented by the host computing device 104 or the update information itself.

At decision block 306 a test is conducted to determine whether the version filter check indicates that the host computing device satisfies the version filter check (e.g., passes the version filter check). If the host computing device 104 passes the version filter check, at block 308, the local computing device management component 116 resets the query criteria. In one embodiment, the local computing device management component 116 can reset the query criteria by restarting a timer or clearing any criteria utilized to determine whether to transmit the request at block 302. Additionally, the local computing device management component 116 can process any information provided by the computing device management component 106 with regard to controlling the query criteria utilized by the local computing device management component 116.

If at decision block 306, the host computing device 104 does not pass the version filter check information, at block 310, the local computing device management component 116 implements updates based on information provided by the computing device management component 106. An illustrative subroutine for implementing updates based on type information for host computing devices 104 will be described with regard to FIG. 4. However, one skilled in the relevant art will appreciate that the implementation of updates on host computing devices 104 or on computing devices 120 may incorporate additional or alternative criteria. The routine 300 then returns to block 308 in which the local computing device management component 116 resets the query criteria.

Figure 4A:
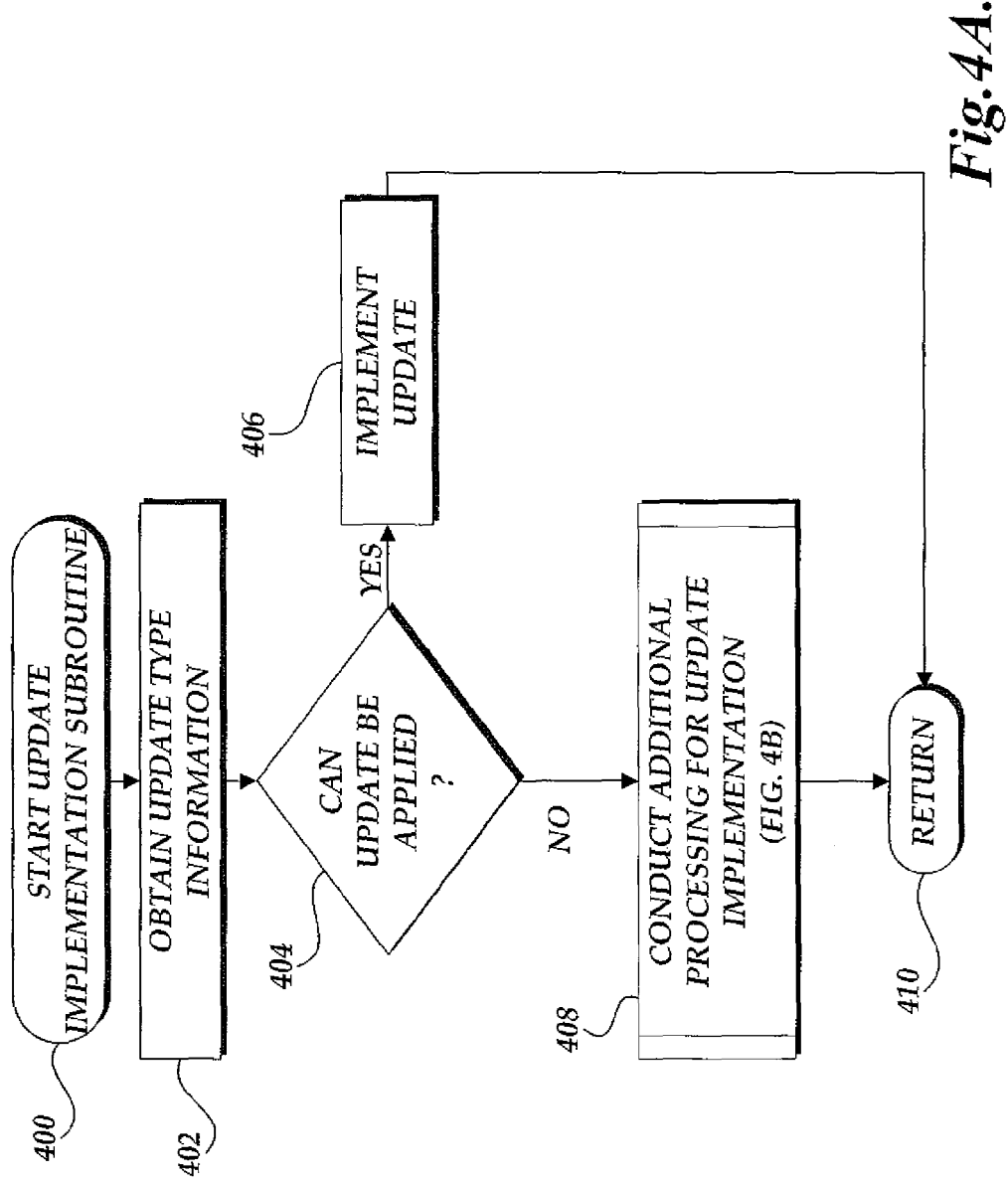
FIG. 4A is a flow diagram illustrating an update implementation subroutine implemented by a computing device.

Turning now to FIG. 4A, a subroutine 400 for update implementation based on type information on a host computing device 104 will be described. Illustratively, the local computing device management component 116 can implement subroutine 400 as part of the execution of block 310 (FIG. 3). At block 402, the local computing device management component 116 obtains update type information for the update to be implementation. In one embodiment, the update type information can specify that the update can be implemented on the host computing device without having to terminate any virtual machine instances or without requiring a reboot. In this embodiment, the local computing device management component 116 may still need to do some additional processing. In another embodiment, the update type information can specify that any existing virtual machine instances may need to be terminated to implement the update, but that the host computing device 104 does not need to be rebooted. In still a further embodiment, the update type information can specify that all existing virtual machine instances need to be terminated and that the host computing device 104 requires a reboot.

At decision block 404, a test is conducted to determine whether the update can be applied (e.g., without termination of any existing virtual machine instances and without requiring a reboot). Illustratively, the local computing device management component 116 can utilize policy information that governs the implementation of updates on the host computing devices 104. For example, policy information for host computing devices 104 hosting virtual machine instances can specify whether or not currently instantiated virtual machine instances need to be terminated prior to implementing updates. In another example, policy information for host computing devices 104 can specify other requirements for the host computing devices that will be utilized to determine whether to implement the update. If the updated can be applied, at block 406, the local computing device management component 116 implements the update and the subroutine 400 returns at block 410.

With reference again to decision block 404, if the update cannot be applied to the host computing device 104 (or other computing device 120), at block 408, the host computing device 104 (or computing device 120) conducts additional processing for update implementation. An illustrative subroutine 450 for conducting additional processing to implement an update will be described with regard to FIG. 4B. At block 410, the subroutine 400 returns.

Illustratively, upon return of the subroutine 400 at block 410, the host computing device 104 (or computing device 120) can reset query criteria and check for additional updates. Accordingly, the host computing device 104 can continuously check and attempt to implement updates. Additionally, in embodiments in which the host computing device 104 (or computing device 120) is in the process of implementing updates that may require the suspension of resources or a reboot, the host computing device 104 can continue to identify and possibly implement additional updates.

Turning now to FIG. 4B, a subroutine 450 for conducting additional processing in order to implement a pending update will be described. Illustratively, the local computing device management component 116 can implement subroutine 400 as part of the execution of block 408 (FIG. 4A). At block 452, the local computing device management component 116 identifies any portion of the pending update that can be implemented. In an illustrative example, at least some portion of an update may implemented even if other portions of the update are dependent on criteria not yet satisfied, such as completion of a previous update or execution of a process. Accordingly, at block 454, the local computing device management component 116 attempts to implement any identified portions of the update information that are not dependent on criteria (e.g., partial updates).

Once the implementation of the identified partial updates or portions of the updates has been initiated, at block 456, the local computing device management component 116 can initiate the suspension one or more resources that are associated with the specific host computing device 102. In one embodiment, the local computing device management component 116 can determine whether to suspend the execution of virtual machine instances currently being executed by the host computing device 104. In another embodiment, the host computing device 104 (or other computing device 120) can determine whether to cause the termination or suspension of virtual machine instances on other host computing devices 104. For example, a computing device in communication with one or more host computing devices 104 may cause the termination of virtual machine instances on the host computing devices prior to implementing an update.

At decision block 458, a test is conducted to determine whether the identified virtual machine instances that need to be suspended or terminated have been suspended or terminated. If not, the subroutine 400 may enter into a waiting period or attempt additional activities to cause the suspension of resources at block 458. Additionally, the local computing device management component 116 may also check to see whether the request to suspend resources should be terminated. For example, the local computing device management component 116 may determine that the request to suspend (or terminate) resources has taken to long, which may be indicative of a failed attempt or likelihood of failure.

With reference again to decision block 458, once any identified virtual machine instances have been suspended (or otherwise terminated), at decision block 462, a test is conducted to determine whether the host computing device requires a reboot. If the host computing device 104 does not require a reboot, the subroutine 450 proceeds to block 466 in which the local computing device management component 116 implements the update and the subroutine 450 returns at block 468. Alternatively, if a reboot is required, at block 464, the local computing device management component 116 initiates a reboot and implements the update. The subroutine 450 returns at block 468. As previously described, in one embodiment, the implementation of the partial updates and suspension of resources can occur in parallel with determination of additional or subsequent update information and the attempted implementation of the additional or subsequent update information.

Turning now to FIG. 5, a routine 500 for processing version filter check requests implemented by a computing device management component 106 will be described. At block 502, the computing device management component 106 obtains a version filter request. In one example, the version filter request is transmitted by the local computing device management component 116. As previously described, the local computing device management component 116 can independently transmit the version filter request in accordance with criteria evaluated by the local computing device management component 116 or other information provided by the computing device management component 106. The version filter request can be an API and can include a variety of information that will be utilized by the computing device management component 106 in processing the request. For example, the version filter request can include information identifying operating system and software applications that are executing on the requesting host computing device 104. In another example, the version filter request can include information identifying the last version, or equivalent version, of the operating system and software applications executing on the host computing device 104. In still further examples, the version filter request can include information that is different from previous information provided by the local computing device management component 116.

At block 504, the computing device management component 106 obtains version filter information that specifies the desired version goal state for the identified computing device, such as host computing device 104. The computing device management component 106 can obtain the version filter information from the computing device version filter data store 110 or from local memory (e.g., cache memory). At decision block 506, a test is conducted to determine whether version filter information corresponds to the version information identified in the version request (directly or indirectly).

If the version filter information does not match with the version information, it can be assumed that the computing device, such as host computing device 104, may have one or more updates to implement. Accordingly, at block 508, the computing device management component 106 identifies update information. In one embodiment, the computing device management component 106 can generate a notification that an update is required and identify one or more potential sources of the update. In another embodiment, the computing device management component 106 can generate the notification and provide the update information required (e.g., code to modify the operating system or software application code). If the version filter information matches the version information (e.g., no update is required) or once the notifications and updates are generated at block 508, at block 510, the computing device management component 106 transmit a response to the requesting local computing device management component 116. As previously discussed, however, in one embodiment, if no update is required, the computing device management component 106 can omit the transmission of any information to the local computing device management component 116. At block 512, the routine 500 terminates.

Figure 6:
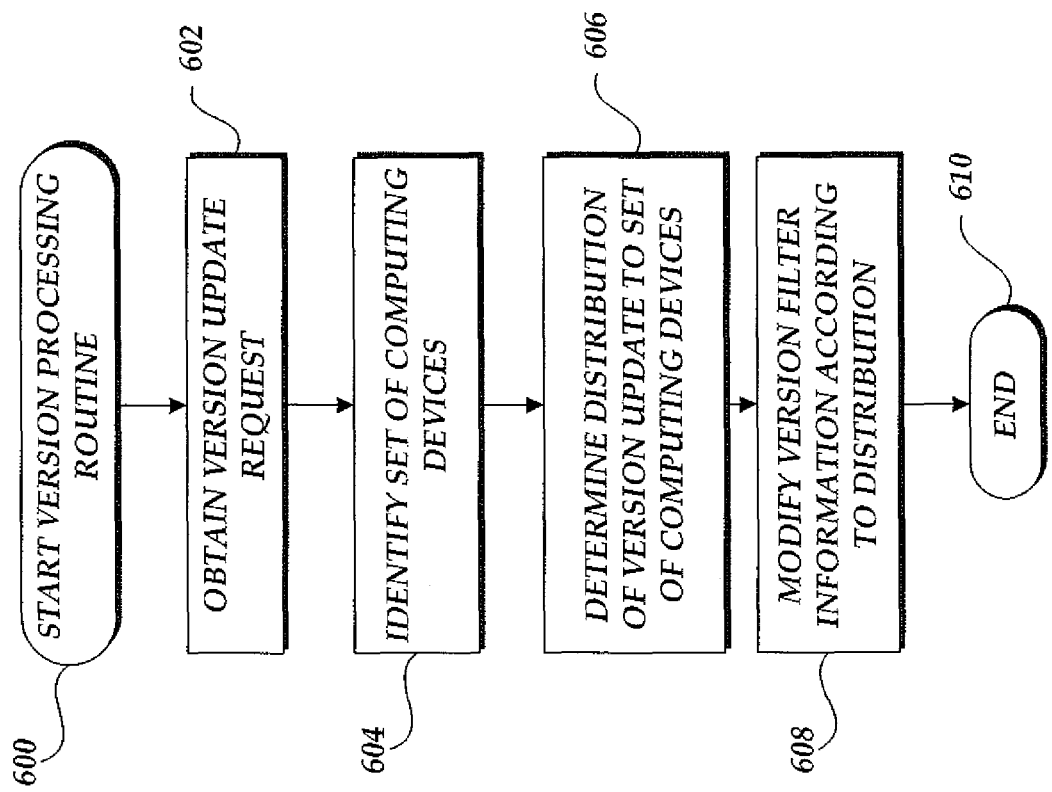
FIG. 6 is a flow diagram illustrating a version processing routine implemented by a host computing device management component.

Turning now to FIG. 6, a routine 600 for creating or managing version filter information will be described. Illustratively, routine 600 can be implemented by a computing device management component 106. However, routine 600 can be implemented, in whole or in part, by other components of the virtual network environment 100. At block 602, the computing device management component 106 obtains a request or notification corresponding to a version update. Illustratively, the request can correspond to an API (such as from a client computing device 118) that specifies a most current version for a host computing device 104 or set of host computing devices 114. The request can identify specific host computing devices or provide criteria that allow the computing device management component 106 to determine how the version update request will apply to each host computing device 104 in the set of host computing devices.

At block 604, the computing device management component 106 identifies that set of computing devices, such as a set of host computing devices 104, that correspond to the version update request. In one example, if the version update request specifically identifies individual host computing devices 104, the computing device management component 106 can utilize the identification information included in the request. In another example, if the version update request includes criteria for selecting the set of host computing devices, the computing device management component 106 can process the criteria. Still further, in some situations, the computing device management component 106 may not necessarily be aware of the current status or presence of all the host computing devices in the set of host computing devices (e.g., a datacenter). In this scenario, the processing of the version filter information may not be done prior to receiving a request from a previously unknown or forgotten host computing device 104.

At block 606, the computing device management component 106 determines a distribution of the version filter information for the set of computing devices. In one embodiment related to host computing devices 104, if individual host computing devices are identified in the version update information, the determination of the distribution can correspond to the selected or identified host computing devices. In another embodiment, the distribution to a set of host computing devices may correspond to random or pseudo random selection of host computing devices from a set of host computing devices. Accordingly, the selected distribution can correspond to an evaluation of the random or pseudo-random processes. In a further embodiment, the distribution to a set of host computing devices can correspond to weighted distribution of host computing devices. For example, the weighting of the set of host computing devices may be utilized to select a test group to implement an update. A second set of weights can then be selected to stagger the implementation to a larger group and can then be repeated several times. In other embodiments, the computing device management component 106 may also implement additional time delays or distribution techniques beyond any distribution information provided in the update request.

At block 608, the computing device management component 106 implements the distribution by modifying version filter in accordance with the determined distribution. At block 610, the routine 600 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing host computing device, wherein the host computing device hosts one or more virtual machine instances, the method comprising:
    under control of one or more processors configured with specific executable instructions,
    obtaining, by a computing device management component, version information for at least one of an operating environment and software executing on a host computing device;
    determining, by the computing device management component, a time distribution of modifications to an operating environment or software applications executing on each computing device of a set of computing devices to implement a goal state for the set of host computing devices according to the version information;
    modifying, by computing device management component, version filter information to implement the determined time distribution of modifications;
    obtaining, by the computing device management component, version filter requests from each host computing devices included in the set of host computing devices, wherein version filter requests are transmitted by a local computing device management component on the host computing device and includes version information associated with a current configuration of the host computing device;
    for each of the host computing devices included in the set of host computing devices,
        obtaining version filter information corresponding to the requesting local computing device management component;
        determining whether the version information included in the version filter request corresponds to the obtained version filter information; and
        transmitting information responsive to the determination to the requesting local computing device management component.

2. The computer-implemented method as recited in claim 1, wherein the version filter information corresponds a grouping of host computing devices.

3. The computer-implemented method as recited in claim 1, wherein the version filter information corresponds to individual host computing devices.

4. The computer-implemented method as recite in claim 1, wherein transmitting information responsive to the determination includes transmitting an identification of an update to be implemented by the requesting host computing device.

5. The computer-implemented method as recite in claim 1, wherein transmitting information responsive to the determination includes transmitting no information if the version information matches the version filter information.

6. The computer-implemented method as recited in claim 1, wherein each of the host computing devices in the set of host computing devices continuously transmit requests to the computing device management component.

7. A computer-implemented method for managing computing devices, the method comprising:
    under control of one or more processors configured with specific executable instructions,
    obtaining, by a computing device management component, version filter requests from each computing devices included in a set of computing devices, wherein the version filter requests include version information associated with a current configuration of the computing device;
    for each of the computing devices included in the set of computing devices,
        obtaining version filter information corresponding to the requesting computing device, wherein the version filter information specifies a policy based distribution of modifications to an operating environment or software applications executing on each computing device of the set of computing devices to implement a goal state for the set of computing devices;
        determining whether the version information included in the version filter request corresponds to the obtained version filter information; and
        transmitting information responsive to the determination to the requesting computing device.

8. The computer-implemented method as recited in claim 7, wherein the version filter information corresponds to a grouping of computing devices or individual computing devices.

9. The computer-implemented method as recite in claim 7, wherein transmitting information responsive to the determination includes transmitting an identification of an update to be implemented by the requesting computing device.

10. The computer-implemented method as recite in claim 7, wherein transmitting information responsive to the determination includes transmitting no information if the version information matches the version filter information.

11. The computer-implemented method as recited in claim 7, wherein each of the computing devices in the set of computing devices continuously transmit requests to the computing device management component.

12. The computer-implemented method as recited in claim 7 further comprising:
    obtaining, by the computing device management component, version information for an operating environment or software executing on a computing device;
    determining, by the computing device management component, the time distribution of modifications for a set of computing devices according to the version information; and
    modifying, by computing device management component, version filter information associated in accordance with the version information and the determined time distribution.

13. The computer-implemented method as recited in claim 12, wherein determining, by the computing device management component, the time distribution of modifications for a set of computing devices according to the version information includes determining a random modification of the version filter information for the set of computing devices.

14. The computer-implemented method as recited in claim 12, wherein determining, by the computing device management component, the time distribution of modifications for a set of computing devices according to the version information includes determining a weighted modification of the version filter information for the set of computing devices.

15. The computer-implemented method as recited in claim 14, wherein determining a weighted modification of the version filter information for the set of computing devices includes associating a weighting to a test group defined for the set of computing devices.

16. The computer-implemented method as recited in claim 7, wherein the set of computing devices is unknown.

17. The computer-implemented method as recited in claim 7, wherein at least one of the set of computing devices corresponds to a host computing device, the host computing hosting one or more virtual machine instances.

18. The computer-implemented method as recited in claim 7, wherein at least one of the set of computing devices corresponds to a network computing device.

19. A computer-readable storage media storing computer-readable instructions, that when executed instruct a processor to perform a method comprising:
   obtaining, by a computing device management component, version information requests from each computing devices included in a set of computing devices, wherein version information requests are transmitted by a local computing device management component on the computing device and includes version information associated with a current configuration of the computing device;
   for each of the computing devices included in the set of computing devices,
      obtaining information associated with a desired version goal state corresponding to the requesting local computing device management component, wherein the desired version goal state is applicable to the set of computing devices and implemented by a policy based distribution of updates to an operating environment or software applications executing on each computing device of the set of computing devices;
      determining whether the version information included in the version information request corresponds to the obtained desired version goal state; and
      transmitting information responsive to the determination to the requesting local computing device management component.

20. The computer-readable storage media as recited in claim 19, wherein the version filter information corresponds to a grouping of computing devices or individual computing devices.

21. The computer-readable storage media as recite in claim 19, wherein transmitting information responsive to the determination includes transmitting an identification of an update to be implemented by the requesting computing device.

22. The computer-readable storage media as recite in claim 19, wherein transmitting information responsive to the determination includes transmitting no information if the version information matches the desired version goal state.

23. The computer-readable storage media as recited in claim 19, wherein each of the host computing devices in the set of computing devices continuously transmit requests to the computing device management component.

24. The computer-implemented method as recited in claim 19 further comprising:
   obtaining, by the computing device management component, update information associated with an update for an operating environment or software executing on a computing device;
   determining, by the host computing device management component, a time distribution of modifications for a set of computing devices according to the update information; and
   modifying, by computing device management component, desired version goal state associated in accordance with the version information and the determined time distribution.

25. The computer-readable storage media method as recited in claim 24, wherein determining, by the host computing device management component, the time distribution of modifications for a set of computing devices according to the update information includes determining a random modification of the desired version goal state for the set of computing devices.

26. The computer-readable storage media as recited in claim 24, wherein determining, by the computing device management component, the time distribution of modifications for a set of computing devices according to the update information includes determining a weighted modification of the desired version goal state for the set of computing devices.

27. The computer-readable storage media as recited in claim 19, wherein the set of computing devices is unknown.

28. The computer-readable storage media as recited in claim 19, wherein at least one of the set of computing devices corresponds to a host computing device, the host computing hosting one or more virtual machine instances.

* * * * *